PATH OF HEAT TRANSFER
← REFLECTED RADIATION
← — INCOMING RADIATION

INVENTOR.
LADISLAS C. MATSCH
BY William F. Mesinger
ATTORNEY

United States Patent Office 3,139,206
Patented June 30, 1964

3,139,206
THERMAL INSULATION
Ladislas C. Matsch, Tonawanda, N.Y., assignor to Union Carbide Corporation, a corporation of New York
Filed Nov. 20, 1961, Ser. No. 153,538
19 Claims. (Cl. 220—9)

This invention relates to an improved insulation having a high resistance to all modes of heat transfer, and particularly concerns a high-temperature, heat-insulating material adapted to improve a vacuum-insulating system.

In U.S. Patent No. 3,007,596, issued November 7, 1961, to L. C. Matsch, there is described a composite multi-layered, external load-free insulation in a vacuum space. The insulation comprises low-conductive fibrous sheet material layers composed of fibers for reducing heat transfer by solid and gaseous conduction, and thin, flexible sheet radiation barrier layers. The radiation barrier layers are supportably carried in superposed relation by the fibrous sheet layers to provide a large number of radiation barrier layers in a limited space for reducing the transmission of radiation heat across the vacuum space without preceptively increasing the heat transmission by solid conduction thereacross. Each radiation barrier layer is disposed in contiguous relation on opposite sides with a layer of the fibrous sheet material, the fibers being oriented substantially parallel to the radiation barrier layers and substantially perpendicular to the direction of heat inleak across the insulating space. The fibrous sheet material is composed of fibers having diameters less than about 10 microns, the radiation barrier sheet has a thickness less than about 0.2 mm., and the multi-layered composite insulation is disposed in the vacuum space to provide more than 4 radiation barrier layers per inch of composite insulation.

U.S. Patent No. 3,009,600, issued November 21, 1961, in the name of L. C. Matsch, describes a preferred low-conductive material for use in this multi-layered insulation, namely permanently precompacted paper composed of unbonded fibers having diameters less than about 5 microns and a length of less than about 0.5 inch. The paper is preferably formed of glass fibers.

The first mentioned patent, incorporated herein by reference to the extent pertinent, describes various materials suitable for employment as the low-conductive fibrous component and the radiation barrier component, with particular emphasis on low-temperature systems, as for example, between liquid oxygen and ambient temperature boundaries. The preferred materials for cryogenic insulations include glass fiber sheets and aluminum or copper foils.

Certain problems arise when one attempts to use this composite multi-layered insulation at high temperatures of at least 900° F. One of the serious problems is chemical and physical stability of the components at such high temperatures. That is, the melting and softening points of materials become limiting factors. For example, the preferred low-temperature composite insulation comprising glass fiber sheets and aluminum foils may not be employed above about 900° F. due to the softening point of glass (about 1,200° F.) and the melting point of aluminum (1,220° F.). Another requirement for higher temperature service is that the materials must not decompose under high temperature or react chemically with any other substances in the insulation system. Either eventuality would seriously impair or destroy the insulating quality. Impurities or other foreign substances such as fiber coatings may be especially detrimental if they vaporize in service. Not only will they impair the vacuum but they will also recondense on shield surfaces and seriously impair their reflectivity. Still another requirement of the radiation shielding component is that of low vapor pressure at the high temperatures encountered in service. When high vacuum must be maintained, only a few microns vapor pressure can be detrimental and prohibitive.

Probably the most significant characteristic of any high-temperature, vacuum space insulation is the greater importance of radiation as a mode of heat transfer. This is due to high values of the term $(T_1^4 - T_2^4)$, where $T_1$ and $T_2$ are the boundary temperatures of the insulation system. For most metals, reflectivity decreases as temperature increases, a characteristic which is adverse to achieving effective insulation when radiation dominates.

It is, therefore, an important object of the present invention to provide an improved vacuum-insulation system for reducing heat transmission by all modes of heat transfer to values well below that of any known insulating system in which the hot boundary temperature is above about 900° F.

Another object is to provide a composite multi-layered insulation system in a vacuum space, which system is highly efficient in minimizing heat transfer between high temperatures above about 900° F., and ambient conditions.

A still further object is to provide a highly efficient composite multi-layered insulation system in a vacuum space, which is chemically and physically stable at high temperatures above about 900° F.

An additional object of this invention is to provide a highly efficient composite multi-layered insulation system in a vacuum space for minimizing radiative heat transfer at high temperatures above about 900° F.

Further objects and advantages of this invention will be apparent from the ensuing disclosure and the appended claims.

Figure 1:
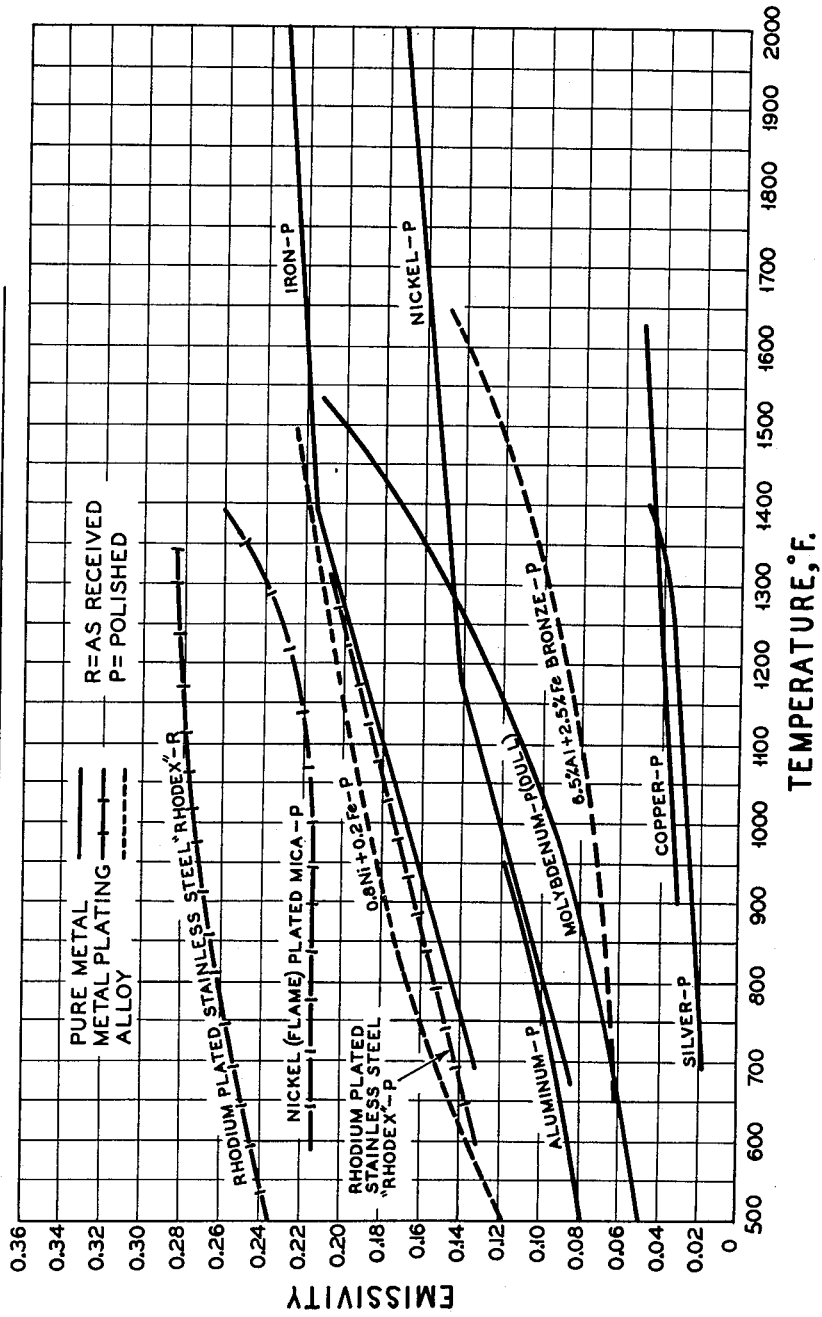
FIG. 1 is a graph showing the emissivities of various radiation-reflecting materials at elevated temperatures.
Figure 2:
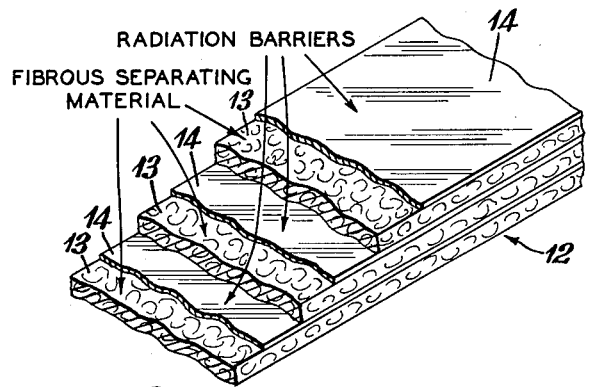
FIG. 2 is an isometric view of the composite insulating material of the invention shown in a flattened position with parts broken away to expose underlying layers.

One embodiment of the invention contemplates apparatus provided with a vacuum space for insulating from high temperatures above about 900° F. A composite multi-layered insulation is provided in the space, comprising low conductive fibrous sheet material layers composed of fibers and flexible sheet radiation barriers. The latter are supportably carried in superposed relation by the fibrous sheet layers to provide a large number of radiation barrier layers in a limited space for reducing the transmission of radiant heat across the vacuum space without perceptively increasing the heat transmission by solid conduction. Each radiation barrier layer is disposed in contiguous relation on opposite sides with a layer of the fibrous sheet material. Also, the fibers of the fibrous sheet material are oriented substantially parallel to the radiation barrier layers and substantially perpendicular to the direction of heat transfer across the insulating space. The fibrous sheet material is composed of fibers selected from the group consisting of quartz, potassium titanate and ceramic materials having diameters less than about 20 microns, and preferably less than 5 microns. Larger diameter fibers result in a substantial increase of heat transfer by solid conduction, and an insufficient number of composite insulation layers per unit thickness. The radiation barrier sheet is selected from the group consisting of copper, nickel and molybdenum having a thickness less than about 1 mm. and preferably less than 0.1 mm. Shields of greater thickness, if provided in sufficient numbers for effective reduction of radiation, will produce such a heavy, dense insulation as to render very difficult proper support by the fiber sheets. Furthermore, thicker shields reduce the flexibility of the insulation so that it is difficult to apply. The multi-layered composite insulation is disposed in the insulation space to provide more than 10 radiation barrier layers per inch of composite. A lesser number of radiation barriers does not effectively impede heat transfer by radiation at high temperatures.

Another essential feature of the radiation barrier material is that it possesses a vapor pressure below about 0.1 micron Hg, and preferably below 0.01 micron Hg at the highest temperature in the vacuum space. If this vapor pressure limitation is exceeded, the metal will vaporize at a prohibitve rate, and the vaporized metal from the innermost barriers near the hot boundary will recondense in cooler regions within the composite insulation. This will eventually result in complete loss of the hot radiation barriers and increase in solid conductance of the low-conductive fibrous sheet material. The vapor pressure limitation is applicable for even short term exposure of the insulation to high temperatures.

The low conductive material also acts as a supporting and spacing material for retaining the radiation barrier sheets in uniformly spaced relation to each other independently of the thickness and stiffness of the barriers. In this manner it is possible for a large number of thin foils to be supportably mounted and maintained in position in an insulation space of limited thickness. A clearance of a few thousandths of an inch between foils is enough to effectively interrupt and reflect the radiant heat. In this way it is possible to provide a large number of shields in a very limited space, ranging up to several hundred shields per inch of composite insulation thickness.

The term "vacuum" as used herein is intended to apply to sub-atmospheric absolute pressure conditions not substantially greater than 500 microns of mercury, and preferably below 100 microns of mercury. For superior quality results, the pressure should preferably be below 25 microns of mercury.

Referring now to the radiation barrier, copper is the preferred shield material for temperatures between about 900° F. and about 1,730° F., the melting point being 1,981° F. The 1,730° F. temperature limitation is based on maintaining the copper vapor pressure below 0.01 micron Hg. Of the materials suitable for this range, copper is the lowest both in emissivity (see FIG. 1) and cost, and except for nickel is the lightest in weight. It is also commercially available in electrodeposited foil thicknesses down to ½ mil (0.0005 inch).

Molybdenum is also satisfactory as the radiation barrier material and has an extremely high melting point of 4,750° F., but to maintain its vapor pressure below 0.01 micron Hg, the practical range for use of molybdenum is limited to temperatures below about 3,490° F. Other advantages are reasonable cost and the ability to be rolled into thin foils.

Nickel is useful mainly because of its relatively high melting point (2651° F.), its reasonable low density, and its availability in rolled foils. At high temperatures, e.g. above 1,200° F., the emissivity of nickel was found to be better than expected due to recrystallization of the metal. Nickel is a particularly attractive shield material for temperatures between about 1,730° F. (limit for copper) and 2,110° F. The upper limit of 2,110° F. is considerably below its melting point (2,650° F.) and is established by requirement that the vapor pressure of the metal be maintained below 0.01 micron Hg.

Other reflective metals have been considered, but are unsatisfactory for use in the present invention, due to a variety of reasons. An inspection of FIG. 1 will reveal that silver possesses very low emissivity, but is relatively heavy and expensive. Rhodium has a very high melting point of 3,570° F. and possesses low emissivity as shown in FIG. 1. However, it is very expensive, and efforts to obtain a highly reflective rhodium plating have not been successful. When electroplated, rhodium has been found to alloy with the base metal. It has been found that the emissivities of alloys are higher than the best reflector of the constituent metals. For example, a bronze containing approximately 90% copper, 6.5% aluminum and 2.5% iron exhibited an emissivity 2 to 3 times higher than pure copper. As another example, a nickel alloy containing 20% iron has an emissivity 50% to 100% higher than pure nickel. Stainless steel has also exhibited the same characteristics at elevated temperatures. For this reason, most alloys are unsatisfactory for use as the radiation barrier layer of the present invention.

The need for a large number of radiant shields per unit thickness in high-temperature insulations dictates the use of very thin separator materials. Permanently precompacted paper-type materials are usually available in thinner sheets than elastically deformable and compressible mat or web-type materials, and are preferred for use as the low-conductive fibrous sheet component of the present insulation.

Binders are prohibitive in the "finished" or as-used insulation because all known binders are volatile at high temperature and will impair vacuum and shield reflectivity.

Ceramic materials have been found particularly suitable as the low-conductive fibrous component. As used herein, the expression "ceramic" materials are those containing oxides of both silicon and aluminum as major components, and may contain minor amounts of other materials as for example $ZrO_2$, $B_2O_3$, and $Na_2O$. In any event the ceramic material must be physically and chemically stable at temperatures above 900° F. and preferably up to at least 2,000° F. Ceramic fiber materials having an average fiber diameter of at least 2.5 microns have been successfully used in the practice of this invention. The ceramic sheet was prepared by deposition in the wet form on a paper-type machine, precompacted and then dried. This particular ceramic sheet is approximately 5 mils thick and weighs 3.5 grams per sq. ft. This ceramic sheet is reported by the manufacturers to have a melting point of 3,200° F. and to possess a thermal conductivity in air of 0.058 B.t.u./hr. sq. ft. ° F./ft. at a mean temperature of 1,000° F. One type of suitable ceramic paper material has the following chemical analysis: $Al_2O_3$—51.3%, $SiO_2$—45.3%, and $ZrO_2$—3.4%. Another satisfactory ceramic fiber paper has the following chemical analysis: $Al_2O_3$—51.2%, $SiO_2$—47.4%, $B_2O_3$—0.7%, and $Na_2O$—0.7%. These materials are sold by the Carborundum Company, Niagara Falls, New York, under the name "Fiberfrax."

Quartz sheeting is another low-conductive fibrous material well suited for use in the present invention. As used herein, the expression "quartz" refers to a form of silica (silicon dioxide, $SiO_2$) occurring in hexagonal crystals which are commonly colorless and transparent, but sometimes also yellow, brown, purple, green and the like. One suitable quartz fiber paper material, "Tissuquartz" is sold by the American Machine and Foundry Company, Springdale, Connecticut. This material is prepared from 0.75 to 1.0 micron diameter quartz fibers.

Two grades of this material have been successfully employed in practicing the invention: Type 200 Q "Tissuquartz" is about 1 mil thick and weighs approximately 1.0 gram per sq. ft.; type 400 Q "Tissuquartz" is approximately 2 mils thick and weighs about 1.75 grams per sq. ft. Both papers contain an appreciable amount of binder (up to 15%–20% by weight), but this is quite volatile and is readily removed by baking at 300–400° F.

Still another satisfactory low-conductive fibrous material is potassium titanate, having the composition $K_2Ti_6O_{13}$. One suitable form is "Tipersul" paper sold by the Du Pont Company, Wilmington, Delaware. This particular paper is a blend of the potassium fibers of about 1.0 micron average diameter, and about 20% by weight ceramic fiber having diameters of 3–5 microns. The average sheet weight of "Tipersul" is 21 grams/sq. ft. and the average sheet thickness is about 25 mils.

As a feature of the invention, the low-conductive sheet of separating material to be used in the present vacuum-solid insulating system should be fabricated in such manner that its fibers are, for all intents and purposes, randomly disposed within the plane of the separating sheet, and oriented in a direction substantially perpendicular to the flow of heat. It will be understood that as a practical matter, the fibers will not be individually confined to a single plane, but rather, in a finite thickness of fibrous material, the fibers will be generally disposed in thin parallel strata with, of course, some indiscriminate cross weaving of fibers across the various strata.

The principal reasons for the far superior insulating effects achieved by such a fiber orientation are believed to be the relatively few fibers traversing the thickness of the insulating sheet and the point contacts established between crossing fibers. These point contacts represent the points of joinder between adjacent fibers in the direction of heat flow, and as such, constitute an extremely high resistance to the flow of heat by conduction. In this fashion it is possible to achieve in a finite thickness of insulating material an extremely high degree of conductive resistance between proximate sheets of radiation sheet. Best results have been obtained when the fiber diameter is less than 1.0 micron, although larger diameter fibers up to about 5.0 microns, and in some instances as high as 20 microns, depending upon the insulation thickness employed, still produce results far superior to the best known practical insulation of the prior art.

Figure 3:
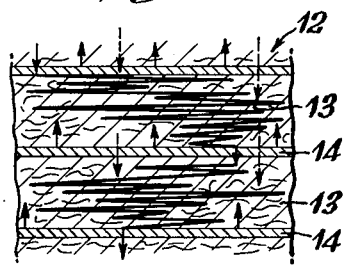
FIG. 3 is a greatly enlarged detail sectional view showing the irregular path of heat transfer through the composite insulating material of the invention.

The sequence of modes of heat transfer which might occur in a typical multi-layer insulation of radiation barriers, e.g. nickel sheets which are proximately spaced from each other by sheetings of low-conductive fibers, e.g. ceramic paper having a fiber orientation substantially parallel to the nickel sheets and transverse to the direction of heat flow, might be as follows:

Referring to FIG. 3, radiant heat striking the first sheet of nickel will for the most part be reflected, and the remaining part absorbed. Part of this absorbed radiation will tend to travel toward the next barrier by re-radiation, where again it will be mostly reflected, part will travel by solid conduction, and a minor part by conduction through the residual gas. According to the solid conduction method of heat transfer, the heat leak proceeds along the fibers in what might be considered an irregular path, crossing relatively small areas of point contact between crossing fibers until it reaches the second sheet of nickel, where the heat reflecting and absorbing process described above is repeated. Because of the particular orientation of the ceramic fibers, the path of solid conduction from the first sheet of nickel to the second is greatly lengthened, and encompasses an extremely large number of point contact resistances between contacting fibers. By analogy it will be seen that a multi-layer insulation having a series of heat reflecting sheets and a fiber oriented sheet of low-conductive insulating material therebetween may be particularly efficient in preventing or diminishing heat losses by radiation, as well as by conduction.

One of the important advantages in the thermal insulation of the present invention is that the flexibility of the layers of radiation sheeting and low-conductive fibrous sheeting allows the insulation thickness as a whole to be pliably bent so as to conform to irregularities and changes in the surface conditions of the container to be insulated. The composite material of the invention is adapted to be applied to contoured surfaces, and is particularly well suited for insulating either flat or cylindrical surfaces.

Figure 4:
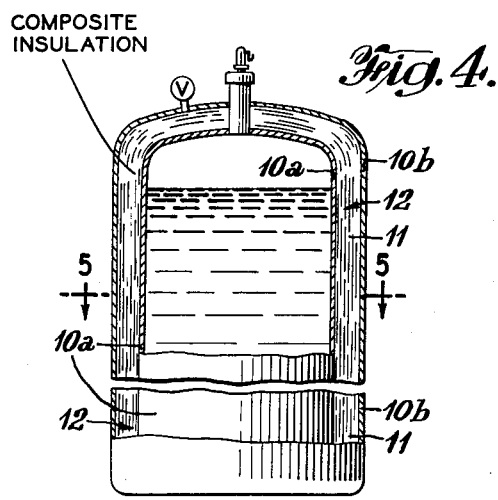
FIG. 4 is a front elevational view, partly in section, of a double-walled product container employing the principles of the invention.

Shown in FIG. 4 is a double-walled heat insulating vessel having parallel inner and outer container walls 10a and 10b and an evacuated insulating space 11 therebetween. Disposed within the insulation space 11 is a composite insulation material 12 embodying the principles of the invention, and comprising essentially a low heat conductive material 13 having incorporated therein multiple reflective shields or radiation barriers 14 for diminishing the transfer of heat by radiation across the insulating space 11. In assembly, the insulation may occupy the entire insulating space 11, and appears as a series of spaced reflectors 14 disposed substantially transversely to direction of heat flow and supportably carried by the solid, low-conductive insulating material. The insulating material contacts and supports the entire surface of each radiation shield and, in addition to its primary purpose of serving as an insulating material, constitutes a carrier and spacing material for maintaining a separation space between adjacent shields.

Figure 6:
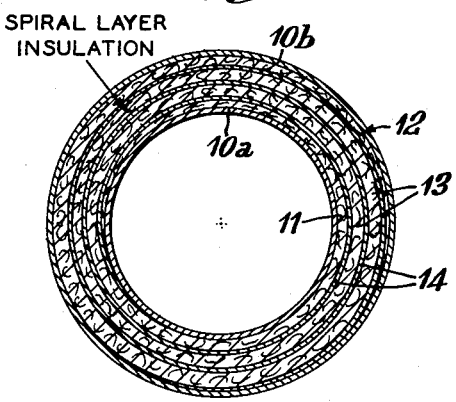
FIG. 6 is a sectional view similar to FIG. 5 illustrating the spiral wrapping of insulating material of the invention.
Figure 5:
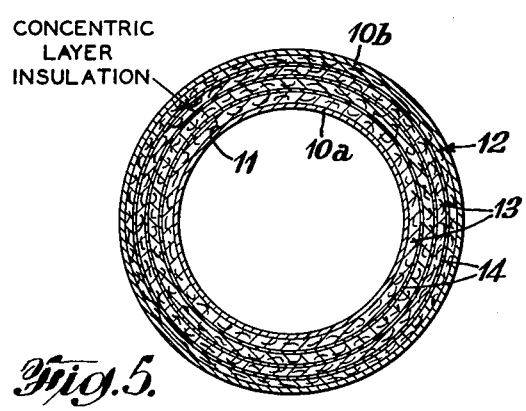
FIG. 5 is a sectional view taken along line 5—5 of FIG. 4 illustrating the concentric wrapping of insulating material of the invention.

The multiple-layer insulation of the invention may be mounted in the insulation space in any one of a variety of ways. For example, in FIG. 5, the insulation 12 may be mounted concentrically with respect to an inner container 10a, or it may be, as in FIG. 6 spirally wrapped around the inner container with one end of the insulation wrapping in contact with the inner container 10a, and the other end nearest an outer container 10b or in actual contact therewith, the latter form of mounting being preferred and illustrated herein. Referring to FIG. 6, the radiation sheeting may be loosely spirally wrapped around the inner container 10a, the tightness and number of turns being varied to suit the particular conditions, or the requirements desired. Tightening of the insulation wrapping causes the low-conductive and resilient fibrous material to be compressed into a smaller space. This action decreases the percentage voids in the fibrous material, and increases the cross sectional area of the effective path of solid conduction. However, the voids are reduced in size, which results in the insulation being less sensitive to changes in casing gas pressure. On the other hand, wrapping the insulation too loosely decreases the number of turns of radiation shielding in the insulation space, and increases heat leak by radiation. Optimum results obtain somewhere between these extremes when the sum of the heat leaks due to radiation and conduction is a minimum. By providing a large number of turns of insulation wrappings, the passage of radiative heat is substantially eliminated, while the conductive heat flow along the spiral path is effectively reduced owing to the lengthened heat path.

It is to be understood that the present insulation is equally suitable for use in vacuum spaces bounded by flat surfaces.

Unless a high-temperature insulation system has an opposite boundary at cryogenic temperature, e.g. −297° F., an adsorbent will not be effective to remove gases accumulating in the vacuum space. This is because the efficiency of adsorbents decreases with increasing temperature, and is negligible at temperatures on the order of 900° F. Getters do not possess this temperature-efficiency relationship. Accordingly, a chemical gettering material is preferably employed to remove gases from the vacuum space, and thus maintain the efficiency of the present insulation at high temperatures. A suitable getter is barium powder which may for example be sealed in a capsule communicating with the vacuum-insulation space. Getters which become active only at high temperature may alternatively be employed, as for example zirconium and titanium. These materials must, of course, be located at appropriate temperature levels in the insulation.

Tests have shown that barium powder getter is fully capable of holding a vacuum of 1.0 micron at a warm side temperature of 1,200° F. In these tests, 2.7 grams of getter powder was exposed after bake-out at 1,430° F. and after pumping to 0.03 micron. A valve between the getter and the insulation space permitted repeated exposure and isolation of the getter. By isolation the pressure was allowed to rise to 5 microns, and after exposure the pressure returned to 1.0 micron or lower in about 1 hour's time.

The invention will be more clearly understood by the following examples:

Example I

In this test, 26 turns of ½ mil (0.0005 inch) copper foil and type 400 Q "Tissuquartz" paper (1.75 grams/sq. ft.) were spirally wrapped to a density of 76.5 foil layers per inch. The composite insulation was then placed in an evacuable space and the pressure therein reduced to less than 1 micron Hg. An overall heat transfer coefficient of $1 \times 10^{-3}$ B.t.u./hr. sq. ft. ° F./ft. was obtained between temperature boundaries of 95° F. and 1,580° F. The copper foil emissivity was determined to be 0.092, and about 95% of the total heat transfer was by radiation.

Example II

In another test, 26 layers of ½ mil copper foil and type 200 Q "Tissuquartz" paper (1.0 gram/sq. ft.) were spirally wrapped to a density of 88 layers per inch for a thickness of 0.295 in. Under a vacuum pressure of less than 1 micron Hg, an overall heat transfer coefficient of $0.950 \times 10^{-3}$ B.t.u./hr. sq. ft. ° F./ft. was obtained between temperature boundaries of 86° F. and 1,430° F.

Example III

In still another test, 25 layers of ½ mil (0.0005 inch) copper foil weighing 8.1 gm./sq. ft. and "Fiberfrax" ceramic paper weighing 3.5 gm./sq. ft. were spirally wrapped at a density of 55 foil layers per inch. Under a vacuum pressure of less than 1.0 micron mercury, an overall heat transfer coefficient of $0.374 \times 10^{-3}$ B.t.u./hr. sq. ft. ° F./ft. was obtained between temperature boundaries of 85° F. and 1,160° F. A coefficient of $0.792 \times 10^{-3}$ was obtained between temperature boundaries of 85° F. and 1,580° F.

The improvement in high-temperature insulating quality afforded by the present invention will be further recognized by a comparison with the prior art materials. One of the best insulations heretofore employed for high temperature is a sheet composed of a ceramic-potassium titanate fiber blend having a thermal conductivity in air of about $30 \times 10^{-3}$ B.t.u./hr. sq. ft. ° F./ft. at a mean temperature of 1,000° F. When this material is placed in a vacuum space at a pressure below about 1 micron Hg, the thermal conductivity is reduced to about $11 \times 10^{-3}$. Referring now to Examples I–III, it can be seen that the overall thermal conductivity can be reduced to less than 0.091 of the latter value by employing the insulation of this invention.

Figure 7:
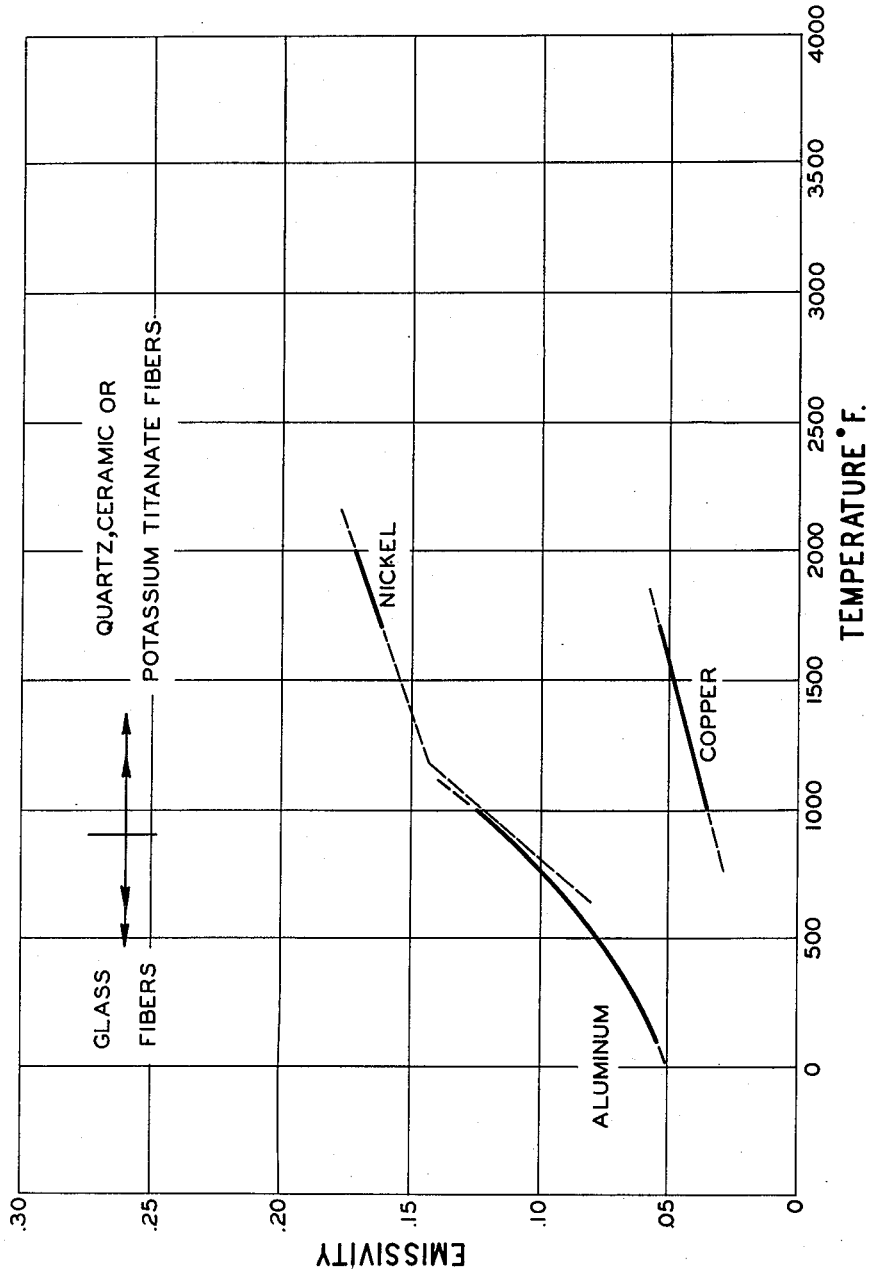
FIG. 7 is a graph showing the emissivity-temperature relationship of aluminum, copper and nickel.

Another embodiment of the invention contemplates multiple types of radiation barrier layers with the same multi-layer composite high-temperature insulation, particular radiative materials being selected as uniquely advantageous for certain temperature ranges. For example, an insulation to be employed between boundary temperatures of 70° F. and 2,000° F. would preferably not consist solely of fibers and radiative sheets compatible with the 2,000° F. temperature, but would alter composition at selected thermal levels through the composite thickness. Sufficient layers of nickel foil and ceramic, quartz or potassium titanate fibers are preferred to reduce the temperature to 1,700° F. at which point the lower emissivity, lower cost copper foil is substituted for nickel. Copper foil and the previously enumerated high-temperature fiber materials are preferably used down to about the 900° F. level where safe transition may be made to the lightweight, minimum cost aluminum foil-glass fiber combination. Copper foil is preferably employed from the 900° F. level down to ambient temperature in systems where lower conductivity is paramount to low cost and low weight. These relationships are depicted graphically in FIG. 7, and the composite multiple radiation sheet insulation itself is in effect illustrated by FIGS. 2–6.

Similarly, transition in the selection of low-conductive fibrous sheet material may be made at various temperature levels. For example, potassium titanate fibers may be employed at temperatures approaching 2,500° F., quartz fibers up to 3,000° F., and ceramic fibers at temperatures up to 3,200° F. These levels are based on the melting points of the respective fibers. The transition temperatures for the radiation barrier and fiber materials need not coincide with each other.

More specifically, this invention contemplates apparatus in which the previously described composite multi-layered insulation is provided in the hot-zone of the vacuum space above about 900° F. and a second composite multi-layered insulation section is provided in the relatively cool zone of said vacuum space below about 900° F. and in contiguous association with the insulation in the hot zone. The second insulation comprises low-conductive glass fiber sheet layers composed of fibers having diameters less than about 10 microns for reducing heat transfer by solid conduction, and aluminum foil layers of less than about 0.2 mm. thickness. The latter are supportably carried in superposed relation by the glass fiber sheet layers, and are also disposed in contiguous relation on opposite sides with a layer of the glass fiber sheet material. The fibers are oriented substantially parallel to the aluminum foil layers and substantially perpendicular to the direction of heat transfer across the vacuum space. The second composite multi-layered insulation is disposed in such space to provide more than 4 aluminum foil layers per inch of the composite. As disclosed in U.S. Patent No. 3,009,600, a preferred glass fiber sheet layer is permanently precompacted paper composed of fibers having diameters less than 5 microns and a length of less than about 0.5 inch. Also, the second composite multi-layered insulation is disposed to provide more than 40 aluminum foil layers per inch of the composite.

Although preferred embodiments of the invention have been described in detail, it is to be understood that modifications and variation may be effected without departing from the spirit and scope of the invention.

This is a continuation-in-part application of Serial No. 4,298, filed January 25, 1960, in the name of L. C. Matsch, and issued November 21, 1961, as U.S. Patent 3,009,600.

What is claimed is:

1. In an apparatus provided with a vacuum space for insulating from high temperatures above about 900° F., a composite multi-layered insulation in said space comprising low-conductive fibrous sheet material layers composed of fibers for reducing heat transfer by solid conduction and thin, flexible sheet radiation barrier layers, said radiation barrier layers being supportably carried in superposed relation by said fibrous sheet layers to provide a large number of radiation barrier layers in a limited space for reducing the transmission of radiant heat across said space without perceptively increasing the heat transmission by solid conduction thereacross, each radiation barrier layer being disposed in contiguous relation on opposite sides with a layer of the fibrous sheet material, the fibers of said fibrous sheet material being oriented substantially parallel to the radiation barrier layers and substantially perpendicular to the direction of heat transfer across the insulating space, said fibrous sheet material being composed of fibers selected from the group consisting of quartz, potassium titanate and ceramic materials and having diameters less than about 20 microns, said radiation barrier sheet being selected from the group consisting of copper, nickel and molybdenum having a vapor pressure below about 0.1 micron Hg at the highest temperature in said vacuum space and having a thickness less than about 1 mm., and said multi-layered composite insulation being disposed in the insulation space to provide more than 10 radiation barrier layers per inch of said composite insulation.

2. Apparatus according to claim 1 in which said fibrous sheet material is quartz, and said radiation barrier sheet material is copper.

3. Apparatus according to claim 1 in which said fibrous sheet material is quartz and said radiation barrier sheet material is nickel.

4. Apparatus according to claim 1 in which said fibrous sheet material is ceramic and said radiation barrier sheet material is copper.

5. Apparatus according to claim 1 in which said fibrous sheet material is ceramic and said radiation barrier sheet material is nickel.

6. Apparatus according to claim 1 in which said fibrous sheet material is ceramic paper having an average fiber diameter of about 2.5 microns and a weight of about 3.5 grams per sq. ft.

7. Apparatus according to claim 1 in which said fibrous sheet material is quartz paper having fiber diameters between about 0.75 and 1.0 micron.

8. Apparatus according to claim 1 in which said fibrous sheet material is potassium titanate paper having an average fiber diameter of about 1.0 micron.

9. Apparatus according to claim 1 in which said composite multi-layered insulation is provided in the hot zone of said vacuum space above about 900° F. and a second composite multi-layered insulation section is provided in the relatively cool zone of said vacuum space below about 900° F. and in contiguous association with the insulation in said hot zone, the second insulation comprising low-conductive glass fiber sheet layers composed of fibers having diameters less than about 10 microns for reducing heat transfer by solid conduction, and aluminum foil layers of less than about 0.2 mm. thickness being supportably carried in superposed relation by the glass fiber sheet layers and also being disposed in contiguous relation on opposite sides with a layer of the glass fiber sheet material, the fibers being oriented substantially parallel to the aluminum foil layers and substantially perpendicular to the direction of heat transfer across said vacuum space, the second composite multi-layered insulation being disposed in such space to provide more than 4 aluminum foil layers per inch of the composite.

10. Apparatus according to claim 9 in which said glass fiber sheet layers are permanently precompacted paper composed of fibers having diameters less than 5 microns and a lentgh of less than about 0.5 inch, and said second composite multi-layered insulation is disposed to provide more than 40 aluminum foil layers per inch of the composite.

11. Apparatus according to claim 9 in which said fibrous sheet material is ceramic and said radiation barrier sheet material is nickel.

12. Apparatus according to claim 9 in which said fibrous sheet material is ceramic and said radiation barrier sheet material is copper.

13. Apparatus according to claim 1 in which a first section of said composite multi-layered insulation is provided in the hot zone of said vacuum space at a boundary temperature above about 1,700° F., and in which said radiation barrier sheet material is nickel; a second section of said composite multi-layered insulation is provided in an intermediate temperature zone of said vacuum space having boundaries between about 1,700° F. and 900° F. and in which said radiation barrier sheet material is copper; and a third section of composite multi-layered insulation is provided in a relatively cool zone of said vacuum space of temperature below about 900° F., said third section comprising low-conductive glass fiber sheet layers composed of fibers having diameters less than about 10 microns for reducing heat transfer by said solid conduction, and aluminum foil layers of less than about 0.2 mm. thickness being supportably carried in superposed relation by the glass fiber sheet layers and also being disposed in contiguous relation on opposite sides with a layer of the glass fiber sheet material, the fibers being oriented substantially parallel to the aluminum foil layers and substantially perpendicular to the direction of heat transfer across said vacuum space, the second composite multi-layered insulation being disposed in such space to provide more than 4 aluminum foil layers per inch of the composite.

14. Apparatus according to claim 1 in which the high-temperature boundary of said vacuum space is less than about 1,730° F., and said radiation barrier material is copper.

15. Apparatus according to claim 1 in which the high-temperature boundary of said vacuum space is less than about 2,110° F., and said radiation barrier material is nickel.

16. Apparatus according to claim 1 in which the high-temperature boundary of said vacuum space is less than about 3,490° F., and said radiation barrier material is molybdenum.

17. Apparatus according to claim 1 in which said radiation barrier sheet has a thickness less than about 0.1 mm.

18. Apparatus according to claim 1 in which said fibrous sheet material is composed of fibers having diameters less than about 5 microns.

19. Apparatus according to claim 1 in which said radiation barrier sheet has a thickness less than about 0.1 mm. and said fibrous sheet material is composed of fibers having diameters less than about 5 microns.

References Cited in the file of this patent
UNITED STATES PATENTS

| | | |
|---|---|---|
| 2,547,607 | Sulfrian | Apr. 3, 1951 |
| 2,776,776 | Strong | Jan. 8, 1957 |
| 3,009,600 | Matsch | Nov. 21, 1961 |